United States Patent [19]
Asahi et al.

[11] Patent Number: 5,520,819
[45] Date of Patent: May 28, 1996

[54] METHOD OF REMOVING SUSPENSIONS FROM WASTEWATER

[75] Inventors: Hiroyuki Asahi, Wakayama; Yasuhiro Yukawa, 2-10, Hourakucho, Nishinomiya-shi, Hyogo, both of Japan

[73] Assignees: Fuji Chemical Ind., Ltd., Wakayama; Yasuhiro Yukawa, Hyogo, both of Japan

[21] Appl. No.: 365,812

[22] Filed: Dec. 29, 1994

[51] Int. Cl.$^6$ .................. C02F 1/54; C02F 1/56
[52] U.S. Cl. ................ 210/727; 210/728; 210/730
[58] Field of Search ..................... 210/726, 727, 210/728, 732, 730

[56] References Cited

U.S. PATENT DOCUMENTS 3,627,680 12/1971 Desbos .
4,933,087 6/1990 Markham, Jr. et al. ............... 210/626
5,368,742 11/1994 Roberts .................................. 210/727
5,433,865 7/1995 Laurent ................................. 210/727

*Primary Examiner*—Neil McCarthy
*Attorney, Agent, or Firm*—Wenderoth, Lind & Ponack

[57] ABSTRACT

The present invention provides a method of removing suspended solids from wastewater, by dissolving and mixing sodium alginate and retarder in the wastewater; adding and mixing metallic salt having a valence of 2 or more, excluding magnesium salt and mercury salt, in the resultant mixture to aggregate the solids; and separating the aggregated solids and resultant clarified water from each other.

16 Claims, No Drawings

METHOD OF REMOVING SUSPENSIONS FROM WASTEWATER

BACKGROUND OF THE INVENTION

The present invention relates to a method of removing suspended solids from wastewaters, including slurries produced during construction work, e.g. pile driving, tunnel excavation, boring, or dredging of rivers and lakes, and effluents such as activated sludge from, e.g. an industrial plant or a sewage plant.

A huge amount of slurry is produced during pile driving, tunnel excavation, boring, or dredging of rivers and lakes. If such slurry is discharged without adequate treatment, it will pollute rivers and the ground. In a common treatment, the slurry is mixed with a nonorganic or polymer flocculant for flocculation of suspended solids or particles. The resultant floc, after having been settled by its own weight, is dewatered with a centrifugal or press dehydrator for conversion to a cake. In another treatment, the slurry is subjected to time-dependent sedimentation for removal of suspended solids of relatively large size, and then the supernatant portion containing a majority of the suspended solids is mixed with a nonorganic or polymer flocculant. The formed floc is settled by its own weight and dewatered with a centrifugal or press dehydrator for conversion to a cake. As the result, a clarified water separated from the suspended solids of a cake will be discharged.

In the foregoing conventional method, both the sedimentation of large sized suspended solids and the flocculation of remaining suspended solids take a considerable length of time. In addition, the dewatering is not an easy job, and after dewatering, the settled floc in cake form still contains a substantial amount of water and will thus be unfavorable for transportation or disposal. Also, some suspended particles remain in the resultant clarified water after removal of the settled floc produced by flocculation with a flocculant, since the conventional method is far from perfect in removal of suspended particles. Furthermore, the consumption of polymer flocculant is large and the overall cost will be increased.

An improved method has been proposed as depicted in Japanese Patent Laid-open Publication No. 58-51997, in which the concentration of suspended solids is carried out by chemical reaction of multivalent metals with sodium alginate to produce a gel form, and by addition of an organic synthetic polymer flocculant. This method allows the coagulation of suspended solids to be effected within a shorter time and produces a dewatered cake which contains less amounts of water. However, the method is not suited for treatment of a slurry produced during construction work such as tunnel excavation or pile driving.

The construction work associated with amounts of concrete as well as dredged soils commonly produces a slurry which contains a high concentration of metallic ions (e.g. aluminum ions). Such a slurry hardly allows an additive of sodium alginate to be dissolved due to the presence of metallic ions. Even if the additive is preliminarily dissolved in water to produce a solution, it will locally react with the metallic ions upon mixing with the slurry, creating particles of metal alginate. This makes it difficult to physically agglomerate and coagulate the suspended solids.

The improved method disclosed in Japanese Patent Laid-open Publication No. 58-51997 for coagulating the suspended solids to a gel form by reaction of multivalent metal with sodium alginate may be applicable to a specific slurry that does not contain a large amount of metallic ions.

SUMMARY OF THE INVENTION

It is an object of the present invention, in view of the above discussion, to provide a method of removing suspended solids form a wastewater that contains a high concentration of metallic ions, with a minimum of time and at a low cost.

For achievement of this object, a method of removing the suspended solids from a wastewater according to the present invention comprises dissolving and mixing sodium alginate and retarder in the wastewater; adding and mixing metallic salt having a valence of 2 or more, i.e. bivalent or higher, excluding magnesium salt and mercury salt, in the resultant mixture for aggregation of the suspended solids; and separating the aggregated solids and resultant clarified water from each other.

DETAILED DESCRIPTION OF THE INVENTION

The wastewater containing suspended solids or particles is not limited to a particular type but may be a slurry produced during construction work, e.g. pile driving, tunnel excavation, boring or dredging, or activated sludge from an industrial or sewage plant.

Preferably, the retarder may be mixed with sodium alginate before addition to the wastewater. If the retarder and the sodium alginate are added separately, the latter will possibly aggregate to form lumps before mixing it up. Otherwise, the retarder, when mixed with the sodium alginate, acts as a dispersant, thus preventing the aggregation of the sodium alginate which will thus be dissolved with ease. It is also preferable to dissolve the retarder and sodium alginate in a very small amount of wastewater before being mixed with the majority of the wastewater.

Although the sodium alginate is employed within a wide range from low to high polymer form, for example, having a polymerization degree of about 300–650, it is preferably of a high polymer form, for example, having a polymerization degree of about 500–650, that is effective with less amount and thus economical.

The retarder may be selected from phosphates including sodium pyrophosphate, sodium tripolyphosphate, sodium hexametaphosphate, sodium hydrogenphosphate and sodium tertiaryphosphate; carbonates including sodium carbonate, sodium hydrogencarbonate and potassium hydrogencarbonate; and citrates including sodium citrate, sodium hydrogencitrate, potassium citrate and ammonium citrate. The retarder may be a combination of them as well as a single compound.

The addition of the retarder can be determined depending on the ambient conditions at the work site. For example, the less retarder used, the faster the generation of gel. Otherwise, the generation of gel will be delayed.

The metallic salt may be any bivalent or higher type excluding magnesium salt and mercury salt. In respect of versatility, cost, safety and chemical reaction, calcium chloride is most preferred.

After the suspended solids are coagulated and removed, the remaining wastewater is mixed again with a nonorganic flocculant and/or a polymer flocculant for flocculation of residual suspended solids.

The nonorganic flocculant is not limited to one particular type but may be selected from, e.g. aluminum sulfate, aluminum chloride and aluminum polychloride.

The polymer flocculant is also not limited but may be selected from, e.g. polyacrylamide, sodium polyacrylate and polyoxyethylene.

The process starts with mixing a given amount of sodium alginate and retarder with a slurry for dissolution by stirring. The sodium alginate will easily be dissolved in a slurry that contains a high concentration of metallic ion while the retarder prevents the metallic ion from substantially reacting with the sodium alginate.

After the dissolution, a bivalent or higher metallic salt, except magnesium or mercury salt, is added and stirred so that sodium in the sodium alginate is substituted with a metal in the metallic salt. Accordingly, alginic acid is turned to a gel form by a cross-linking effect of the metal. Also, the suspended solids are captured and retained in the gel during bridge formation, and separated from the water as the gel is aggregated in the bottom.

The aggregated suspended solids are then dewatered with, e.g. a roll press, a pressure dehydrator or a centrifugal dehydrator, thus turning to a cake form that contains a minimum amount of water. As the suspended solids have successfully been removed, the slurry is changed to a clarified water.

If the clarified water produced by the method of the present invention where a large portion of suspended solids can be removed does not remain clean, small amounts of applicable nonorganic flocculant and polymer flocculant can be added thereto for further purifying.

All the above steps are usually conducted at room temperature and do not need cooling or heating.

Preferred examples of the present invention will now be described in more detail. The examples described are illustrative and not limitative of the scope and spirit of the present invention.

EXAMPLE 1

A ground slurry of 200 g (containing 27.3% of suspended solids) was sampled at a location in Kawasaki City of Kagawa Prefecture in Japan. Different amounts of sodium alginate mixture (comprising 90% sodium alginate having a polymerization degree of about 500 and 10% sodium tripolyphosphate that acts as a retarder) were added to the slurry so that its concentration ranged up to 0.7%, followed by stirring for about 3 minutes for dissolution. Also, 5 ml of 10% calcium chloride solution was mixed and agitated for another 3 minutes. As the result, a gel retaining the suspended solids of the slurry was produced. The gel was then filtered with a 180-mesh polyester fabric, whereby a cake of the suspended solids and a first clarified water were separated from each other.

The percentage of remaining water in and the weight and volume of the cake in relation to the concentration of sodium alginate mixture are shown in Table 1, while the volume and the transparency of the first clarified water are shown in Table 2.

In succession, 2 ml of 1% aluminum sulfate solution was added as a nonorganic flocculant to the first clarified water and agitated for 10 seconds. As the result, a sediment was separated from the first clarified water, leaving a supernatant or second clarified water. The amounts of the sediment after 5 minutes, 30 minutes, 2 hours, 3 hours, 4 hours, and 18 hours are shown in Table 3 with the state of the supernatant.

As apparent from Tables 1 to 3, the suspended solids are successfully removed from the slurry by addition of the sodium alginate mixture, and also, the resultant first clarified water is processed to the second clarified water with higher transparency by addition of the aluminum sulfate solution.

EXAMPLE 2

Another ground slurry of 200 g (containing 22.6% of suspended solids) was sampled at a location in Urawa City of Saitama Prefecture in Japan and tested in the same manner as Example 1. The results are shown in Tables 4 to 6.

As apparent from Tables 4 to 6, the suspended solids are successfully removed from the slurry by addition of the sodium alginate mixture, and also, the resultant first clarified water is processed to a second clarified water with higher transparency by addition of the aluminum sulfate solution.

COMPARATIVE EXAMPLE 1

The same procedures of Examples 1 and 2 were carried out with 0.2%, 0.3%, 0.4%, 0.5%, 0.6% and 0.7% of sodium alginate but with no use of the retarder. As the result, it was found difficult to dissolve the sodium alginate in the slurry. Attempts for mixing the sodium alginate in a powder form or 3% solution resulted in no change.

In the case of 0.5% or more of the sodium alginate, slight aggregation occurred only when the calcium chloride was added. However, the aggregation was too slight to provide an acceptable result.

EXAMPLE 3

An upper portion of a dredged slurry (containing 33% of suspended solids) was sampled in an amount of 200 g and tested in the same manner as Example 1 using a sodium alginate mixture (comprising 80% sodium alginate having a polymerization degree of about 400 and 20% sodium citrate that acts as a retarder) in concentrations of 0.2%, 0.4% and 0.6%. As the result, a solid cake and a clarified water were separated from each other.

Another sample of the upper portion slurry without any treatment was subjected to attempted dewatering but clearly passed through the polyester fabric.

EXAMPLE 4

200 g of a lower portion of the dredged slurry (containing 65% of suspended solids) was sampled and tested in the same manner as Example 1 using the sodium alginate mixture (comprising 80% sodium alginate having a polymerization degree of about 300 and 20% sodium citrate which acts as a retarder) in concentrations of 0.4% and 0.6%. As the result, a suspended solid cake and a clarified water were separated from each other.

Another sample of the lower portion slurry without any treatment was subjected to attempted dewatering but failed to pass through the polyester fabric.

Shown in Table 7 are the percentage of remaining water in, and the weight of, the cake, and the volume and transparency of the clarified water, in relation to the concentration of sodium alginate mixture. The clarified water obtained in Example 3 was measured for COD concentration and the resultant measurements are also shown in Table 7.

As apparent from Table 7, the dredged slurry was successfully separated into a suspended solid cake and a clarified water by the method of the present invention. It is also clear that the concentration of COD is remarkably reduced from about 2000 ppm in the original slurry. The more sodium alginate mixture added, the less the COD concentration is reduced. This may result from the presence or residual sodium elginate in the clarified water.

COMPARATIVE EXAMPLE 2

The same procedures as Examples 3 and 4 were carried out using upper and lower portions of the dredged slurry and the sodium elginate, but with no use of the retarder. As the result, the suspended solids somehow aggregated when as high as 1.5% of the sodium alginate was added in each case. Such an amount of sodium alginate is expensive and the overall cost of treatment will increase.

TABLE 1

| ARTICLE | Conc. of Sodium Alginate Mixture (%) | | | | | |
|---|---|---|---|---|---|---|
| | 0 | 0.2 | 0.3 | 0.4 | 0.5 | 0.7 |
| WATER (%) | 24.3 | 30.0 | 30.6 | 32.6 | 31.5 | 33.7 |
| WEIGHT (g) | 60.2 | 98.5 | 101.8 | 106.2 | 112.9 | 118.7 |
| VOLUME (ml) | 31 | 62 | 70 | 73 | 80 | 83 |

TABLE 2

| ARTICLE | Conc. of Sodium Alginate Mixture (%) | | | | | |
|---|---|---|---|---|---|---|
| | 0 | 0.2 | 0.3 | 0.4 | 0.5 | 0.7 |
| VOLUME (ml) | 120 | 98 | 95 | 93 | 90 | 82 |
| TRANSPARENCY (cm) | 0 | 15.0 | 7.0 | 12.0 | 5.5 | 2.5 |

TABLE 3

| TIME | ARTICLE | Conc. of Sodium Alginate Mixture (%) | | | | | |
|---|---|---|---|---|---|---|---|
| | | 0 | 0.2 | 0.3 | 0.4 | 0.5 | 0.7 |
| 5 min. | VOLUME OF SEDIMENTATION (ml) | 120 | 3 | 0.5 | 6 | 7 | 15 |
| | STATE OF SUPERNATANT | — | D | D | C | A | A |
| 30 min. | VOLUME OF SEDIMENTATION (ml) | 117 | 4 | 2 | 4 | 5 | 10 |
| | STATE OF SUPERNATANT | A | B | B | B | A | A |
| 2 hrs. | VOLUME OF SEDIMENTATION (ml) | 110 | 4 | 4 | 4 | 5 | 9 |
| | STATE OF SUPERNATANT | A | B | B | A | A | A |
| 3 hrs. | VOLUME OF SEDIMENTATION (ml) | 105 | 4 | 4 | 4 | 5 | 8 |
| | STATE OF SUPERNATANT | A | B | A | A | A | A |
| 4 hrs. | VOLUME OF SEDIMENTATION (ml) | 100 | 4 | 4 | 4 | 5 | 8 |
| | STATE OF SUPERNATANT | A | B | A | A | A | A |
| 18 hrs. | VOLUME OF SEDIMENTATION (ml) | 72 | 4 | 4 | 4 | 5 | 7 |
| | STATE OF SUPERNATANT | A | A | A | A | A | A |

NOTES:
The amount of suspended solid is; A: nothing, B: small, C: not small, not large, D: large.

TABLE 4

| ARTICLE | Conc. of Sodium Alginate Mixture (%) | | | | | |
|---|---|---|---|---|---|---|
| | 0 | 0.2 | 0.3 | 0.4 | 0.5 | 0.7 |
| water (%) | 26.0 | 27.6 | 28.8 | 32.4 | 30.8 | 34.4 |
| weight (g) | 83.0 | 117.3 | 120.2 | 126.0 | 128.0 | 136.0 |
| volume (ml) | 43 | 70 | 76 | 81 | 84 | 88 |

TABLE 5

| ARTICLE | Conc. of Sodium Alginate Mixture (%) | | | | | |
|---|---|---|---|---|---|---|
| | 0 | 0.2 | 0.3 | 0.4 | 0.5 | 0.7 |
| VOLUME (ml) | 92 | 85 | 80 | 75 | 74 | 67 |
| TRANSPARENCY (cm) | 0 | 2.0 | 4.5 | 3.8 | 2.7 | 1.5 |

TABLE 6

| TIME | ARTICLE | Conc. of Sodium Alginate Mixture (%) | | | | | |
|---|---|---|---|---|---|---|---|
| | | 0 | 0.2 | 0.3 | 0.4 | 0.5 | 0.7 |
| 5 min. | VOLUME OF SEDIMENTATION (ml) | 95 | 5 | 5 | 7 | 9 | 16 |
| | STATE OF SUPERNATANT | — | C | C | D | B | A |
| 40 min. | VOLUME OF SEDIMENTATION (ml) | 92 | 4 | 4 | 5 | 6 | 10 |
| | STATE OF SUPERNATANT | — | A | A | A | A | A |
| 2 hrs. | VOLUME OF SEDIMENTATION (ml) | 92 | 3 | 3 | 3 | 5 | 9 |
| | STATE OF SUPERNATANT | — | A | A | A | A | A |
| 3 hrs. | VOLUME OF SEDIMENTATION (ml) | 91 | 3 | 3 | 3 | 5 | 8 |
| | STATE OF SUPERNATANT | A | A | A | A | A | A |
| 24 hrs. | VOLUME OF SEDIMENTATION (ml) | 86 | 4 | 3 | 3 | 4 | 7 |
| | STATE OF SUPERNATANT | A | A | A | A | A | A |

NOTES:
The amount of suspended solid is; A: nothing, B: small, C: not small, not large, D: large.

TABLE 7

| | | Conc. of Sodium Alginate Mixture (%) | | | | |
|---|---|---|---|---|---|---|
| | | Upper portion of dredged slurry | | | Lower portion of dredged slurry | |
| ARTICLE | | 0.2 | 0.4 | 0.6 | 0.4 | 0.6 |
| cake | WATER (%) | 30.6 | 33.5 | 34.3 | 33.5 | 32.5 |
| | WEIGHT (g) | 90 | 95 | 96.5 | 181 | 187 |
| clarified water | VOLUME (ml) | 124 | 130 | 142 | 37 | 44 |
| | TRANSPARENCY (cm) | 2.0 | 1.8 | 1.0 | 0.5 | 1.0 |
| | COD (ppm) | 64 | 116 | 202 | — | — |

What is claimed is:

1. A method of removing suspended solids from wastewater, comprising the steps of:

dissolving and mixing sodium alginate and retarder in the wastewater, said wastewater containing metallic ions that, in the absence of said retarder, would react with said sodium alginate creating particles of metal alginate that would render the agglomeration and coagulation of said suspended solids unsuccessful, said retarder thus preventing said metallic ions from substantially reacting with the sodium alginate;

adding and mixing metallic salt having a valence of 2 or more, excluding magnesium salt and mercury salt, in the resultant mixture to substitute a metal of said added metal salt for the sodium in said sodium alginate, thereby turning the alginate to a gel form by a cross-linking effect of the added metal, said gel aggregating the suspended solids; and separating the aggregated solids and resultant clarified water from each other.

2. A method as claimed in claim 1, wherein the retarder is mixed with the sodium alginate before addition thereof to the wastewater.

3. A method as claimed in claim 1, wherein the metallic salt is calcium chloride.

4. A method as claimed in claim 2, wherein the metallic salt is calcium chloride.

5. A method as claimed in claim 1, wherein the retarder is at least one member selected from the group consisting of sodium pyrophosphate, sodium tripolyphosphate, sodium hexametaphosphate, sodium hydrogenphosphate, sodium tertiaryphosphate, sodium carbonate, sodium hydrogencarbonate, potassium hydrogencarbonate, sodium citrate, sodium hydrogencitrate, potassium citrate and ammonium citrate.

6. A method as claimed in claim 2, wherein the retarder is at least one member selected from the group consisting of sodium pyrophosphate, sodium tripolyphosphate, sodium hexametaphosphate, sodium hydrogenphosphate, sodium tertiaryphosphate, sodium carbonate, sodium hydrogencarbonate, potassium hydrogencarbonate, sodium citrate, sodium hydrogencitrate, potassium citrate and ammonium citrate.

7. A method as claimed in claim 3, wherein the retarder is at least one member selected from the group consisting of sodium pyrophosphate, sodium tripolyphosphate, sodium hexametaphosphate, sodium hydrogenphosphate, sodium tertiaryphosphate, sodium carbonate, sodium hydrogencarbonate, potassium hydrogencarbonate, sodium citrate, sodium hydrogencitrate, potassium citrate and ammonium citrate.

8. A method as claimed in claim 4, wherein the retarder is at least one member selected from the group consisting of sodium pyrophosphate, sodium tripolyphosphate, sodium hexametaphosphate, sodium hydrogenphosphate, sodium tertiaryphosphate, sodium carbonate, sodium hydrogencarbonate, potassium hydrogencarbonate, sodium citrate, sodium hydrogencitrate, potassium citrate and ammonium citrate.

9. A method as claimed in claim 1, further comprising the steps of:

adding a nonorganic flocculant, a polymer flocculant or both said flocculants to the clarified water to aggregate remaining suspended solids; and separating the aggregated remaining solids from the water.

10. A method as claimed in claim 2, further comprising the steps of:

adding a nonorganic flocculant, a polymer flocculant or both said flocculants to the clarified water to aggregate remaining suspended solids; and separating the aggregated remaining solids from the water.

11. A method as claimed in claim 3, further comprising the steps of:

adding a nonorganic flocculant, a polymer flocculant or both said flocculants to the clarified water to aggregate remaining suspended solids; and separating the aggregated remaining solids from the water.

12. A method as claimed in claim 4, further comprising the steps of:

adding a nonorganic flocculant, a polymer flocculant or both said flocculants to the clarified water to aggregate remaining suspended solids; and separating the aggregated remaining solids from the water.

13. A method as claimed in claim 5, further comprising the steps of:

adding a nonorganic flocculant, a polymer flocculant or both said flocculants to the clarified water to aggregate remaining suspended solids; and separating the aggregated remaining solids from the water.

14. A method as claimed in claim 6, further comprising the steps of:

adding a nonorganic flocculant, a polymer flocculant or both said flocculants to the clarified water to aggregate remaining suspended solids; and separating the aggregated remaining solids from the water.

15. A method as claimed in claim 7, further comprising the steps of:

adding a nonorganic flocculant, a polymer flocculant or both said flocculants to the clarified water to aggregate remaining suspended solids; and separating the aggregated remaining solids from the water.

16. A method as claimed in claim 8, further comprising the steps of:

adding a nonorganic flocculant, a polymer flocculant or both said flocculants to the clarified water to aggregate remaining suspended solids; and separating the aggregated remaining solids from the water.

* * * * *